Oct. 23, 1962   A. T. FASSERO ET AL   3,059,274
MOLD DOLLY

Filed Aug. 10, 1959   2 Sheets-Sheet 1

INVENTORS
ANTHONY T. FASSERO &
BY JAMES R. MADDOX
ATTORNEY

Oct. 23, 1962 A. T. FASSERO ET AL 3,059,274
MOLD DOLLY
Filed Aug. 10, 1959 2 Sheets-Sheet 2

INVENTORS
ANTHONY T. FASSERO &
BY JAMES R. MADDOX
ATTORNEY 3,059,274
MOLD DOLLY
Anthony T. Fassero and James R. Maddox, Oakland,
Calif., assignors to The James C. Heintz Company,
Cleveland, Ohio, a corporation of Ohio
Filed Aug. 10, 1959, Ser. No. 832,783
1 Claim. (Cl. 18—2)

This invention relates to an improved mold dolly adapted for use with a tire press, particularly for retreading a tire.

The mold is spring supported on the dolly, and may be pivoted from a vertical to a horizontal position, and vice versa.

Normally the mold is supported on the dolly in a vertical position, as the dolly is moved from one position to another. With the mold in this position the dolly is rolled to a press. Here the mold is swiveled to a horizontal position. There the matrices are separated for positioning a tire in the mold, or removing a tire from the mold. The loaded mold dolly is rolled from the press to means for heating it and vulcanizing the new tire tread, and then rolled back to the press for removal of the tire.

The invention will be further described in connection with the accompanying drawings which are only illustrative.

In the drawings—

FIGURES 2–4 are quite schematic, omitting unnecessary details. The press may be of any usual type.

Figure 1:
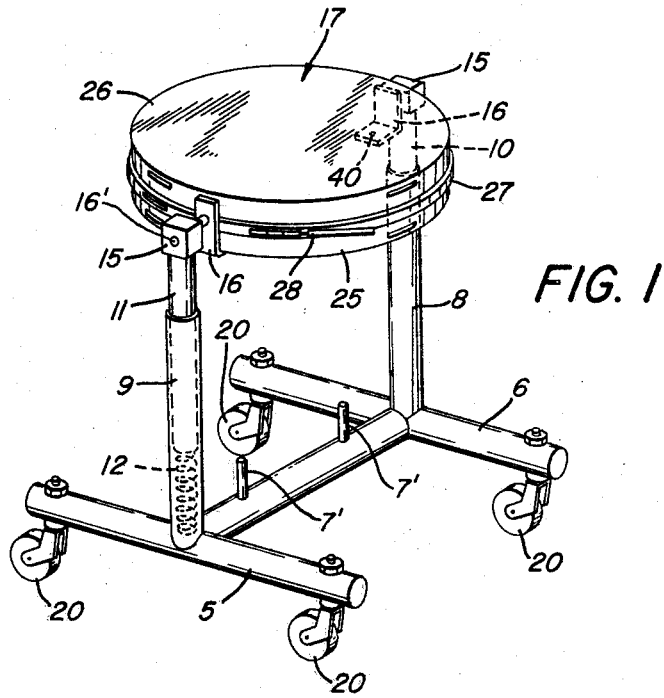
FIG. 1 is a view in perspective of the mold dolly.
Figure 5:
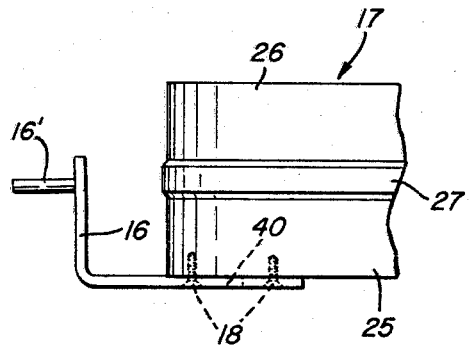
FIG. 5 is a view in perspective showing how the mold is supported in the dolly.

The dolly is composed of two longitudinal support members 5 and 6, and a cross member 7. Upright posts 7' register into a bracket to position the dolly laterally. Two tubular uprights 8 and 9 rise from the longitudinal members at the cross member. These are hollow, at least at the top. The posts 10 and 11 fit into the tubes 8 and 9 and are supported therein by springs 12; one spring being shown in the bottom of the tubular member 8, and the structure of the other side of the dolly being identical.

At the top of the posts are the blocks 15. A bracket 16 pivotally supported in the block by a pin 16', extends inwardly and downwardly from each of these blocks, and the matrix 17 is bolted by bolts 18 to the brackets. The dolly includes rotatable casters 20 to facilitate its movement from one place to another.

The mold is composed of the lower matrix 25 and the upper matrix 26. These are held together by a band 27 with locking means 28, all of which may be of any usual construction. The locking means shown includes a pivoted handle on one end of the band which is engaged with a catch on the other end of the band and is snapped closed, tightening the band to hold the two portions of the mold together.

Figure 2:
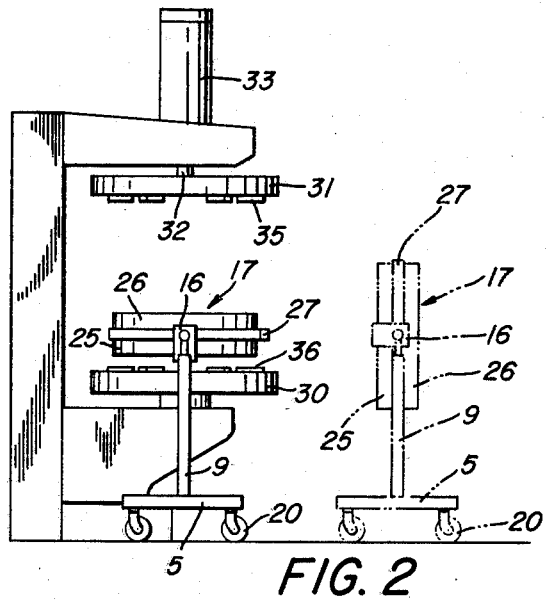
FIG. 2 shows in dot-dash lines the dolly with the mold in a vertical plane before being positioned in the press, and in full lines shows the mold in horizontal position between the platents of the press.

Ordinarily the mold containing a tire which has just been retreaded, is brought to a press for retreading another tire. The mold is preferably supported on the dolly in a vertical plane when rolled from one position to another, and this is illustrated in dot-dash lines in FIG. 2. Suitable catch means or the like (not shown) on the mold and on one of the uprights may be used to hold the mold in this position. The mold is pivoted to the horizontal position as it is moved over the lower platen 30 of the press. The dolly with the mold in this postion is shown in full lines in FIGURE 2. The upper platen 31 attached to the piston 32 is then lowered by gravity or by the cylinder 33. Air connections to the cylinder are not shown, the drawings being schematic.

The mold must be located on the platen 30 in proper position with respect to the matrix-engaging means 35 and 36 on the upper and lower platens, respectively. Any suitable registering means may be employed. FIGURE 1 shows openings 40 in the brackets which support the matrix. Dowel pins (not shown) on the lower platen in line with the uprights 8 and 9 register in these openings and thus insure proper location of the mold on the platens.

Figure 3:
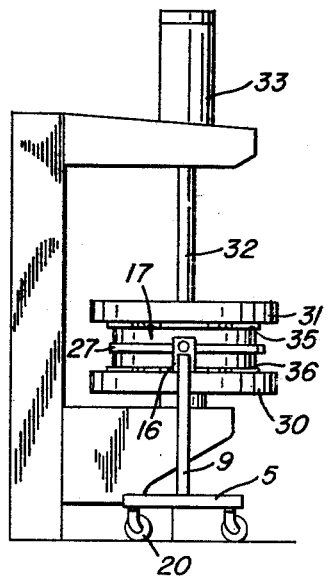
FIG. 3 shows the mold in the closed press.
Figure 4:
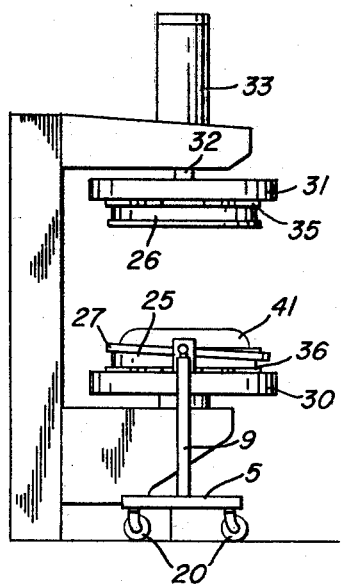
FIG. 4 shows the mold opened in the press.

FIGURE 3 shows the press closed. The matrix-engaging means 35 and 36 are actuated to engage the respective upper and lower matrices; the band 27 is loosened so that the matrices may be separated, and then by actuating the cylinder 33 the upper platen is lifted away from the lower platen as illustrated in FIG. 4. Any finished tire then in the matrix is removed and a fresh tire 41 with an uncured tread is inserted. An air bag (not shown) is inserted in the tire in any usual manner, and is inflated as usual. The upper platen is then lowered again and the two matrices are brought together and are then held together by the band 27. This stage in the procedure is illustrated by FIGURE 3.

The matrix-engaging means 35 and 36 are then released from the matrices and the upper platen is again raised by the cylinder 33 and the springs 12 in the dolly lift the mold from the lower platen over any registering means that projects upwardly from the lower platen. The various elements are then again in the position shown in full lines in FIGURE 2, except of course there is a fresh tire in the mold. The dolly is then rolled from the press and the mold is turned to the vertical position illustrated in dot-dash lines in FIG. 2. The dolly is now moved to a vulcanizing station for vulcanizing the new tread. The mold is preferably wired for heating, and at the vulcanizing station there is a battery of heating plugs. The mold is plugged in. After the cure, the mold is unplugged, the dolly is again rolled to the press and the cycle is repeated.

The drawings 2–4 are schematic. Many types of retreading presses can be used. The matrices may be of any suitable type and may be held together in any suitable manner, and any suitable means is used for holding them on the platens.

The invention is covered in the claim which follows.

What we claim is:

A dolly which includes a base with wheels thereon to facilitate its movement from place to place, two uprights with a mold pivotally supported between them adjacent their tops, said uprights being telescopically mounted on the base with spring means resiliently supporting the uprights above the base.

References Cited in the file of this patent

UNITED STATES PATENTS

| | | |
|---|---|---|
| 1,382,398 | Wildrought | June 21, 1921 |
| 1,406,433 | Atcheson | Feb. 14, 1922 |
| 1,738,326 | Smith | Dec. 3, 1929 |
| 2,111,233 | Zangl | Mar. 15, 1938 |
| 2,171,511 | Winnegar et al. | Aug. 29, 1939 |
| 2,877,531 | Heine | Mar. 17, 1959 |
| 2,891,764 | Pearne | June 23, 1959 |
| 2,903,742 | Barefoot | Sept. 15, 1959 |
| 2,916,772 | McDonald | Dec. 15, 1959 |

FOREIGN PATENTS

| | | |
|---|---|---|
| 125,338 | Germany | June 27, 1900 |